Figure 1:
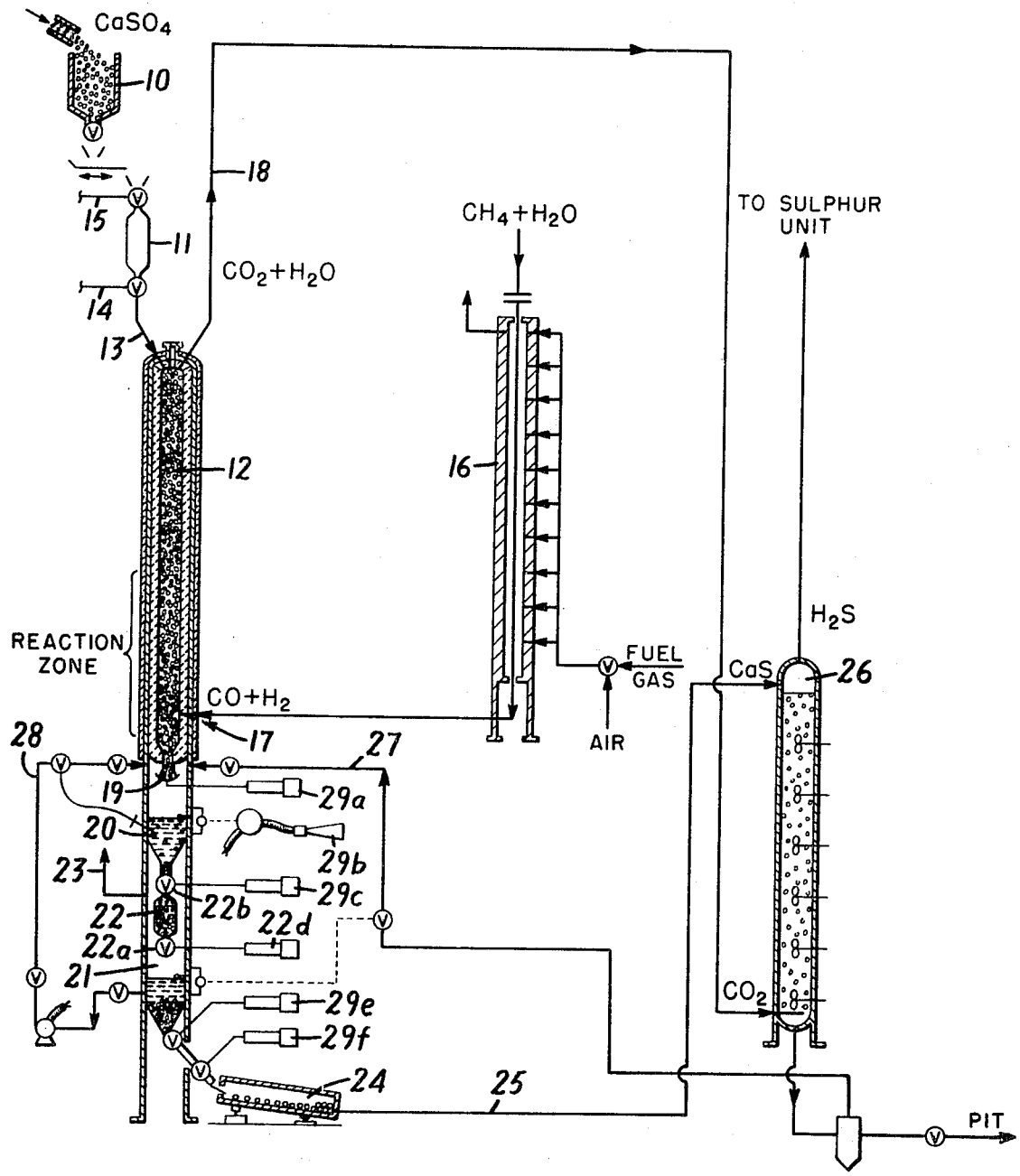

United States Patent

Orahood

[15] 3,661,518

[45] May 9, 1972

[54] PROCESS FOR CONVERTING SULFATES TO SULFIDES

[72] Inventor: John L. Orahood, Midland, Tex.

[73] Assignee: Elcor Chemical Corporation, Midland, Tex.

[22] Filed: Feb. 24, 1970

[21] Appl. No.: 14,735

Related U.S. Application Data

[63] Continuation of Ser. No. 662,650, Aug. 23, 1967, abandoned.

[52] U.S. Cl. ............................................................23/137
[51] Int. Cl. ................................................C01b 17/20
[58] Field of Search ..............................23/137, 181, 262, 1

[56] References Cited

UNITED STATES PATENTS 1,212,702 1/1917 Specketer et al. ........................23/137
1,457,436 6/1923 Howard et al. ..........................23/137
2,740,691 4/1956 Burwell ...................................23/137

FOREIGN PATENTS OR APPLICATIONS 273,878 12/1910 Germany .................................23/137

*Primary Examiner*—Oscar R. Vertiz
*Assistant Examiner*—G. O. Peters
*Attorney*—Brumbaugh, Graves, Donohue & Raymond

[57] ABSTRACT

A process is described whereby gypsum is reacted with a reducing gas at temperatures in the order of 1,800° F. to reduce the gypsum to calcium sulfide, and the calcium sulfide thus produced is water quenched with no substantial loss of material and minimum scale formation by quenching under conditions of water temperature and pressure such that no steam is generated.

5 Claims, 2 Drawing Figures

INVENTOR.
JOHN L. ORAHOOD

INVENTOR.
JOHN L. ORAHOOD

PROCESS FOR CONVERTING SULFATES TO SULFIDES

This application is a continuation of application Ser. No. 662,650 filed Aug. 23, 1967, and now abandoned.

This invention relates to a process for the reductive conversion of calcium sulfate to calcium sulfide and to a novel apparatus useful for that purpose.

Processes are known whereby calcium sulfate in particle form is contacted with reducing gases at elevated temperatures to convert calcium sulfate to calcium sulfide and to produce a mixture of carbon dioxide and water as by-products. Reaction temperatures in the order of 1,600° F. are used, and the calcium sulfide leaving the reaction zone at this temperature must be shielded from an oxidizing atmosphere until it has cooled below about 700° F. When the calcium sulfide thus produced is dropped through an atmosphere of inert gases into a tank of water, a substantial quantity of fine, dust-like particles of the calcium sulfide are entrained with the steam and carried off. Besides representing a loss of substantial quantities of material, the flashing of steam containing the fines causes severe scale formation requiring frequent shutdowns for cleaning. In unpressurized systems, attempts have been made to reduce steam formation by employing a high rate of water flow. However, this has the considerable disadvantage of diluting the sulfide with large amounts of water.

It has now been found that the severe scaling problem and product losses of the prior art procedures are avoided by preventing steam formation during the step of water quenching. This, in turn, is accomplished by maintaining the quenching water at a temperature below its boiling point during quenching, together with the maintenance of water condensing conditions in the atmosphere above the quenching bath. The quenching water may be refrigerated, but the preferred method involves the maintenance of pressure conditions to raise the boiling point of the quenching water. After the particles of calcium sulfide have been thoroughly wetted, the quenched calcium sulfide is depressured to atmospheric pressure conditions with the production of steam, and with substantially no scaling or product loss and with substantially no scaling. The production of steam at this point also provides desirable cooling action.

Sulphur recovered by the Frasch process continues to be the major source of sulphur in the United States. However, it is recognized that the known reserves of Frasch sulphur will soon be depleted, and there is increasing interest in developing methods of recovering sulphur from gypsum. The method of this invention is useful in a process of recovering sulphur from gypsum, in which the calcium sulfate is reduced to calcium sulfide with a stream of reducing gases at high temperature with carbon dioxide and water as by-products. The calcium sulfide is thereafter decomposed to calcium carbonate and hydrogen sulfide, and sulphur is recovered from the stream of hydrogen sulfide.

Figure 2:
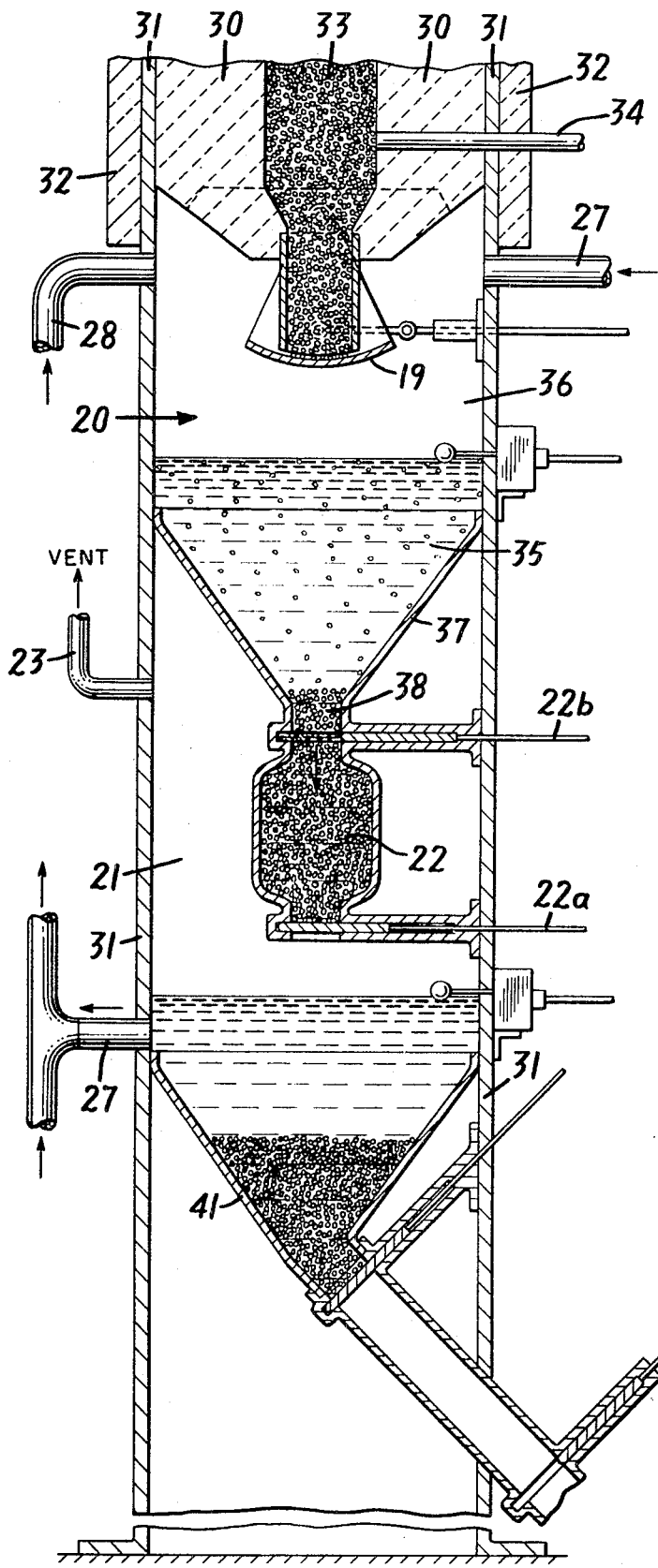

The invention will be described in conjunction with the attached drawings in which FIG. 1 is a flow diagram showing several steps in a process of recovering sulphur from gypsum in which the process of the present invention is used, and FIG. 2 shows the apparatus embodying the quenching system of this invention.

Referring to FIG. 1, calcium sulfate in the form of gypsum is provided, preferably as uniformly sized particles ranging from about ¼ inch to 1 inch in maximum dimension. These particles are preferably preheated to drive off some of the water of crystallization. After preheating, the gypsum is stored in hopper 10.

From the hopper 10, the gypsum is conveyed to a feed pot 11 which is used to feed the rock into the shaft furnace 12 through conduit 13. The shaft furnace 12 operates under from 10 to 100 pounds pressure, and valve means are provided as at 14 and 15, to permit the filling of the shaft furnace 12 without substantial pressure drop in the furnace. The calcium sulfate forms a bed within the furnace 12, in which the rock moves gradually downward as the reaction proceeds.

The rock is contacted countercurrently with a stream of reformed methane produced by passing methane through the reformer 16. The stream of reformed gas comprising carbon monoxide, carbon dioxide and hydrogen is introduced near the bottom of the shaft furnace 12 through nozzle 17.

In a typical process, the gas entering the reactor has a temperature of about 1,800° F. As it proceeds upwardly along the column of sulfate, the temperature first increases to 1,900° F., and then drops; the reaction zone continues until the temperature falls below 1,500° F. At the gas outlet at the top of the vessel, a temperature of 450° F. is typical. Thus, the reaction zone runs upwardly from the nozzle 17 for several feet, until the 1,500° F. line is reached.

There are two reactions which take place in the reaction zone of the furnace. The first may be set forth as follows:

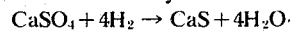

The second reaction which occurs is

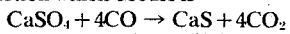

Each of these reactions is exothermic, thus supplying heat to the reaction zone. The gaseous products of the reaction, carbon dioxide and water, leave the top of the shaft furnace 12 through line 18 and are collected for use at a subsequent point in the process. The calcium sulfide is removed from the bottom of the furnace through clam shell valve 19.

The hot calcium sulfide rock is dumped at periodic intervals through the clam shell valve 19. It falls into an upper chamber of water 20. The chamber is maintained at the same pressure as the bottom of the bed of rock in the shaft furnace. The water level is controlled to maintain sufficient water in chamber 20 to provide the desired quenching capacity.

The temperature of water in the upper chamber 20 is controlled so that it is always below the boiling point of water at prevailing pressure. Generally, temperatures in the range of 220° to 250° F. will be used where the pressure in the chamber is between 60 and 70 psig.

Following the quenching step, hot water and the quenched rock are dropped in batches from the upper chamber 20 to the lower chamber 21 through the feed pot 22. Valve 22a is closed and valve 22b opened to permit a batch of calcium sulfide with quenching water to drop into pot 22. Valve 22b is then closed, after which valve 22a is opened, permitting the hot water and calcium sulfide to drop into chamber 21. Some of the hot water will flash to steam, thus cooling the remaining water and the steam is vented to the air through vent 23. Because the rock has been wetted in chamber 20, however, there is no loss of calcium sulfide solids and there is no substantial problem of scaling caused by the deposit of calcium sulfide on equipment surfaces.

From the chamber 21, the quenched calcium sulfide passes through ball mill 24 where it is ground into a slurry and is then carried through conduit 25 to the top of the calcium sulfide decomposition tank 26. In this unit, the slurry of calcium sulfide is contacted countercurrently with a stream of carbon dioxide, preferably that recovered from the top of shaft furnace 12. The calcium sulfide slurry is agitated by paddles, as shown, and by the stream of carbon dioxide gas introduced in the bottom of vessel 26. Hydrogen sulfide gas is collected at the top of vessel 26 and is carried off to a elemental sulphur recovery unit.

In conducting the process of the present invention, it is important that the quenching water be maintained at a temperature below its boiling point throughout the quenching operation. To achieve this in the apparatus shown in FIG. 1, cool water is continuously fed into chamber 20 by means of the lines 27 and 28. The water in line 27 is recovered by dewatering the calcium carbonate slurry which exits from the bottom of vessel 26. As an additional source of water, line 28 carries water which is recycled from chamber 21, as well as make-up water.

The water level in chamber 20 is controlled. A flow of sufficiently cooled water must be maintained to keep the temperature of the quenching water at a temperature below its boiling point. It is also important that the level of water not proceed above a certain point to prevent water from contacting the hot reactor bed. A further device for controlling the water level is the frequency with which the pot 22 is filled and dumped. Thus, the controls 29a, 29b, 29c, 29d, 29e and 29f are set to provide the desired time cycle for dumping the calcium sulfide and the desired water level in each chamber.

FIG. 2 shows the apparatus of the present invention in more detail. Referring to FIG. 2, there is shown the bottom portion of the shaft furnace 12, including a refractory lining 30, the steel shaft wall 31 and an insulating material 32 on the exterior surface of the shaft wall 31. The gypsum rock is held in the interior 33 of furnace 12. Hot reformer gas enters the bottom of the column of gypsum rock through nozzle 34. When in operation, the temperature of the rock in the reaction area adjacent the nozzle 34 is about 1,800° F.

The clam shell valve 19 is an automatic, continuously cycling dumping valve, which dumps measured batches of calcium sulfide from the bottom of the reaction zone 33. Immediately below the clam shell valve 19 is chamber 20, which is adapted to contain a water bath 35 and a head space 36 of a gas inert to calcium sulfide. The bottom portion of the water bath 35 is supported by a funnel shaped member 37 which leads to opening 38 and knife valve 22b. Directly beneath the knife valve 22b is pot 22 having at the lower extremity thereof a second knife valve 22a. Located in the shaft below pot 22 is chamber 21 having a hopper 41 adapted to contain a mixture of water and quenched calcium sulfide rock.

It is understood, of course, that various modifications of the embodiment described above will occur to those skilled in the art. For example, the pot 22 used as a means for depressuring quenched calcium sulfide may be replaced by any suitable valve means which will permit exiting of portions of the quenched sulfide will cause an undesired pressure drop in the system.

I claim:

1. In a process of reducing sulfates to sulfides whereby sulfide particles are produced from sulfates by reduction at high temperatures, the step of quenching the sulfide particles with water under conditions whereby the water temperature is maintained below its boiling point to prevent production of steam during the wetting of the sulfide particles and permitting steam to form from the wetted particles in a subsequent step of the process.

2. A process of reducing calcium sulfate to calcium sulfide comprising the steps of contacting calcium sulfate with reducing gases at a temperature in the range of 1,500° to 1,800° F. to produce a calcium sulfide product having a temperature in said range, reducing the temperature of the sulfide to below 700° F. before exposure thereof to oxidizing conditions by quenching said hot calcium sulfide particles in water while maintaining the temperature of the water below its boiling point to prevent the production of steam during the wetting of the sulfide particles and permitting steam to form from the wetting particles in a subsequent step of the process.

3. The process of claim 2 wherein the reaction takes place under from 10 to 100 psig, the water quenching step takes place under a pressure of 10 to 100 psig, where the temperature of the quenching water is maintained below its boiling point at the pressure used, and where the quenched sulfide particles are removed from the quenching chamber by depressuring with steam formation.

4. In a process of reducing sulfates to sulfide whereby sulfide particles are produced from sulfates by reduction at high temperatures, the step of quenching the sulfide particles with water under conditions whereby the water temperature is maintained below its boiling point to prevent production of steam during the wetting of the sulfide particles, the amount of water employed being limited to prevent substantial dilution of the sulfide, and permiting steam to form from the wetted particles in a subsequent step of the process.

5. A process of reducing calcium sulfate to calcium sulfide comprising the steps of contacting calcium sulfate with reducing gases at a temperature in the range of 1,500° to 1,800° F. to produce a calcium sulfide product having a temperature in said range, reducing the temperature of the sulfide to below 700° F. before exposure thereof to oxidizing conditions by quenching said hot calcium sulfide particles in water while maintaining the temperature of the water below its boiling point to prevent the production of steam during the wetting of the sulfide particles and while avoiding excessive dilution of the sulfide with large amounts of water, and permitting steam to form from the wetted particles in a subsequent step of the process.

* * * * *